United States Patent [19]

Harano et al.

[11] 4,240,000
[45] Dec. 16, 1980

[54] ROTARY ELECTRIC MACHINE WITH A HEAT PIPE FOR COOLING

[75] Inventors: Keiichi Harano, Sagamihara; Shigeaki Oyama, Hachioji, both of Japan

[73] Assignee: Fujitsu Fanuc Limited, Tokyo, Japan

[21] Appl. No.: 961,630

[22] Filed: Nov. 17, 1978

[30] Foreign Application Priority Data

Nov. 17, 1977 [JP] Japan .................... 52-137266

[51] Int. Cl.$^3$ .............................................. H02K 9/00
[52] U.S. Cl. ........................................ 310/54; 310/52; 310/64; 165/105
[58] Field of Search ......................... 310/52, 54, 64; 165/105

[56] References Cited

U.S. PATENT DOCUMENTS

| | | | |
|---|---|---|---|
| 1,750,750 | 3/1930 | Gay | 310/54 UX |
| 2,330,121 | 9/1943 | Heintz | 310/52 |
| 2,743,384 | 4/1956 | Turner | 310/54 |
| 3,528,494 | 9/1970 | Levedahl | 165/105 |
| 3,566,676 | 3/1971 | Hays | 165/105 UX |
| 3,715,610 | 2/1973 | Brinkman | 310/54 |
| 3,771,591 | 11/1973 | Larsen | 165/105 X |

*Primary Examiner*—Donovan F. Duggan
*Attorney, Agent, or Firm*—Armstrong, Nikaido, Marmelstein & Kubovcik

[57] ABSTRACT

A rotary electric machine with a heat pipe for cooling, which pipe comprises a rotary shaft. The rotary shaft has a hole formed therein extending from a heating zone to a cooling zone and has working fluid charged therein. The inner diameter of the cooling zone is smaller than the diameter of the heating zone, and an inner wall of the cooling zone is connected to an inner wall of the heating zone via a step.

2 Claims, 4 Drawing Figures

ROTARY ELECTRIC MACHINE WITH A HEAT PIPE FOR COOLING

BRIEF DESCRIPTION OF THE INVENTION

This invention relates to the construction of a rotary electric machine, such as an electric motor which has heating members, such as an armature and a rotor. More particularly, this invention relates to a rotary electric machine having a heat pipe of improved construction for cooling the rotary electric machine.

BACKGROUND OF THE INVENTION

It is well known to construct a heat pipe for cooling by forming a hole in a rotary shaft extending from a heating zone to a cooling zone and by charging working fluid in the hole so that heat generated from an armature and a rotor of an electric motor can be removed. However, such a conventional heat pipe for cooling has been able to achieve only an insufficient cooling effect.

SUMMARY OF THE INVENTION

It is an object of the present invention to provide a rotary electric machine which includes a heat pipe having a high cooling effect and which can be manufactured at a low manufacturing cost without degrading the simplicity of the construction or the easiness of manufacturing. This object can be achieved by improving the construction of a heat pipe disposed in a rotary electric machine, especially the construction of a hole formed in the heat pipe.

BRIEF DESCRIPTION OF THE DRAWINGS

The present invention will now be explained in detail with reference to the accompanying drawings, wherein.

DETAILED DESCRIPTION OF THE INVENTION

Figure 1:
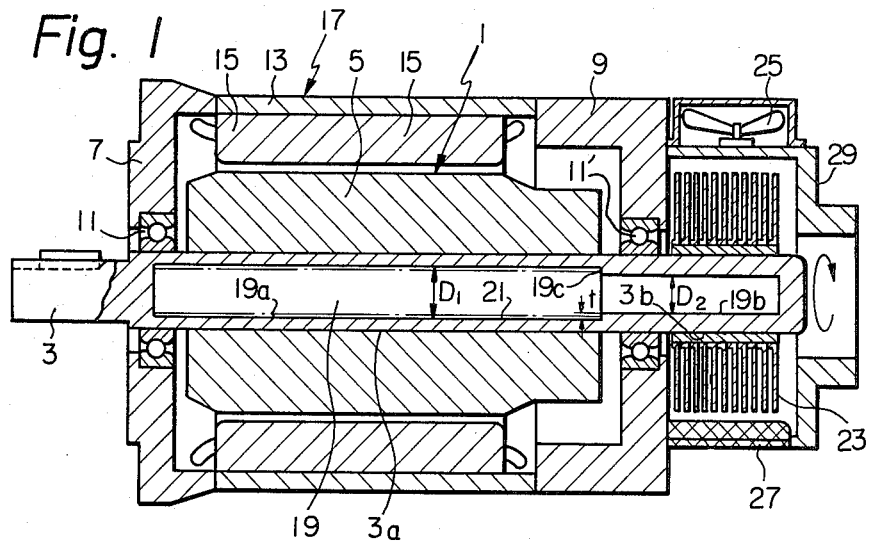
FIG. 1 is a cross sectional elevational view of a direct current motor of an embodiment according to the present invention.

Referring to FIG. 1, which is a cross sectional elevational view of a direct current motor of an embodiment according to the present invention, the electric motor comprises a rotor 1 and a stator 17. The rotor 1 comprises a rotary shaft 3 and an armature 5 secured to the rotary shaft 1, and the rotary shaft is rotatably supported by bearings 11 and 11' disposed in cases 7 and 9, respectively. A yoke 13 is disposed between the cases 7 and 9, and has field poles 15 mounted thereon, so that the stator 17 is constructed. Commutators and brushes (not shown), both of which are utilized for supplying an electric current to the armature 5, are disposed in the electric motor.

When the electric motor illustrated in FIG. 1 is rotated, the inside of the electric motor is heated by means of the armature 5. To radiate the heat generated in the electric motor, a hole 19 is formed within the rotary shaft 3 so that it extends from a portion of the rotary shaft 3 where the armature 5 is secured (this portion will be referred as the heating zone 3a hereinafter because this portion is heated by the armature 5) to a rear portion of the rotary shaft 3 (this portion will be referred as the cooling zone 3b hereinafter because this portion radiates the heat generated by the armature 5 as will be described later). The pressure within the hole 19 is reduced and working fluid is charged within the hole so that a heat pipe is constructed. The cooling zone 3b of the heat pipe has a cylindrical inner wall 19b, the diameter of which is $D_2$, and the heating zone 3a also has a cylindrical inner wall, the diameter $D_1$ of which is larger than $D_2$, so that the inner wall of the cooling zone 3b is connected to the inner wall of the heating zone 3a via a step 19c, the amount of which is t. A plurality of radiating fins 23, which are made of heat conductive metal, such as aluminum, are fixed via a cylindrical sleeve of aluminum on the cooling zone 3b positioned at the rear extremity of the rotary shaft 3. A housing 29 is provided with a cooling fan 25 and mesh 27 introducing cooling air, and the housing 29 is secured to the rear extremity of the case 9 so that the cooling fan 25 and the mesh 27 face the radiating fins 23. As a result, the heat transferred from the armature 5 to the heat pipe through the heating zone 3a heats and evaporates the charged working fluid 21, and then, the vapor of the working fluid reaches the cooling zone and is cooled, so that the latent heat of the vapor is discharged, and the latent heat is radiated through the radiating fins 23.

Figure 2:
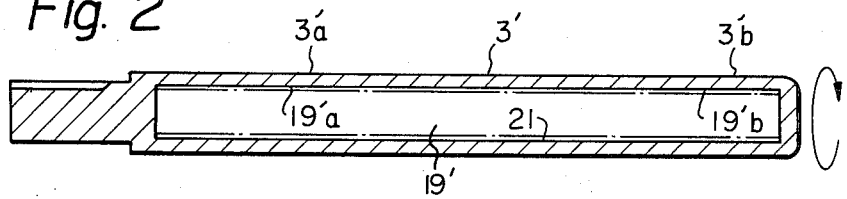
FIGS. 2 and 3 are cross sectional views of conventional heat pipes.

Advantages obtained by the present invention will now be explained with reference to FIGS. 1 through 3 in comparison with the operation of the conventional apparatus. Referring to FIG. 2, which illustrates a conventional rotary shaft of a conventional rotary electric machine with a heat pipe for cooling, the conventional heat pipe includes a hole 19' formed in the rotary shaft 3', and the diameter of the inner wall 19'a of the heating zone 3'a is the same as the diameter of the inner wall 19'b of the cooling zone 3'b. The hole 19' has a small amount of working fluid 21 charged therein. When the rotary shaft 3' is rotated, the charged working fluid forms a thin fluid layer over the entire inner wall, which includes the inner wall 19'a of the heating zone and the inner wall 19'b of the cooling zone, due to the centrifugal force caused by the rotation and the viscosity of the working fluid. Since the thin fluid layer can receive heat from the armature 5 through the inner wall 19'a, the charged working fluid can be evaporated effectively. However, since the fluid layer has a large thermal resistance, the latent heat discharged while the vapor is condensed cannot be transferred effectively to the inner wall of the cooling zone. As a result, the heat transmission of the heat pipe is degraded.

As mentioned above, the above mentioned conventional heat pipe has low heat transmission efficiency at the cooling zone while the heat pipe rotates. To obviate such low efficiency, there is a proposal wherein an inner wall 19'b of cooling zone in a rotary shaft 3" constituting a heat pipe, is formed in a concavo-conical shape spreading out toward an inner wall 19"a of heating zone 3"a, as illustrated in FIG. 3, so that the inner walls 19"a and 19"b are connected together without substantially forming step therebetween. According to the construction illustrated in FIG. 3, it is expected that the working fluid 21 covers only a part of the concavo-conical shaped inner wall 19"b of the cooling zone, and that the condensed working fluid and the working fluid covering a part of the concavo-conical shaped inner wall 19"b flow along the concavo-conical shaped inner wall 19"b due to gravity and the centrifugal force caused by the rotation, and that the heat transmission efficiency can be increased. However, if a heat pipe illustrated in FIG. 3 has a small conical angle of the inner wall 19"b of the cooling zone, the advantages caused by the spread out concavo-conical shaped inner wall can be obtained only when the rotary shaft 3" is rotated at a high speed. If the conical angle of the inner wall 19"b is steep, as illustrated by a broken line in FIG. 3, the length of the inner wall 19"b is short, and then, the condensing area in the cooling zone becomes small. As a result, the heat transmission efficiency becomes as low as that of a heat pipe having the large heat resistance of the inner wall 19"b.

In comparison with the above-mentioned conventional heat pipes, the heat pipe according to the present invention, illustrated in FIG. 1, has an inner diameter $D_2$ of the cooling zone and an inner diameter $D_1$ of the heating zone wherein the diameter $D_2$ is smaller than $D_1$, and the inner wall 19b of the cooling zone is connected to the inner wall 19a of the heating zone via the step 19c. The amount of the charged working fluid is so selected that the working fluid wets the inner wall 19a of the heating zone but does not wet the inner wall 19b of the cooling zone while the rotary shaft 3 is rotated at a speed more than a predetermined rotating speed. As a result, the working fluid in the liquid state cannot be transferred from heating zone to the cooling zone by means of the step portion 19c. Accordingly, the fluid layer of working fluid does not cover the inner wall of the cooling zone or increase the heat resistance thereof, and the rotary electric machine according to the present invention can be cooled effectively when it is rotated at high speed. Since the amount of the working fluid required is only enough to wet the inner wall of the heating zone, the amount of the working fluid is small. The amount t of the step 19c is naturally one half of the difference between the inner diameters $D_1$ and $D_2$. If the amount t of the step portion satisfies the following equation, the charged working fluid in the liquid state does not flow into the cooling zone while the heat pipe rotates at a speed more than a predetermined speed at which the fluid layer of working fluid is not formed on the inner wall 19B.

$$\alpha \cdot \frac{\pi}{4} D_1^2 l \leq \pi D_1 l t$$

or $$t \geq \frac{\alpha}{4} D_1$$

wherein the length of the heating zone is designated by l, and the ratio of the amount of the working fluid to the volume of the heating zone is designated by $\alpha$.

In practical use, the amount t of the step portion is 1 to 2 mm for a heat pipe having diameter of 50 mm. Since the decrease of the inner wall area of the cooling zone and the increase of the heat resistance thereof due to the existence of the step are very small, no problems are caused in practical use.

Figure 3:
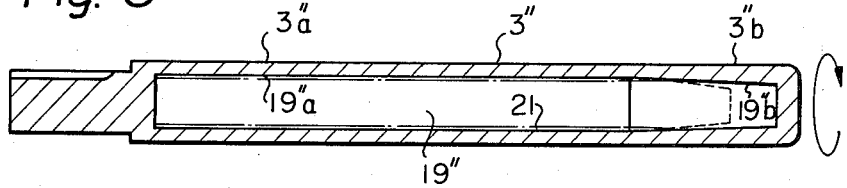

When the inner walls of the heating and cooling zones are formed in cylindrical shapes as illustrated in FIG. 1, the formation of the inner walls is easier than the formation of the spread out concavo-conical shaped inner wall illustrated in FIG. 3. When heat pipes are made from commercially available pipes, the heat pipe illustrated in FIG. 1 can be made from a thinner pipe than that illustrated in FIG. 3, which has a spread out concavo-conical shape. This is because, the smallest diameter of the pipe illustrated in FIG. 3 is usually smaller than that of the pipe illustrated in FIG. 1 and because a thicker pipe is necessary for the pipe illustrated in FIG. 3.

The number of the steps according to the present invention can be 2 or more.

Figure 4:
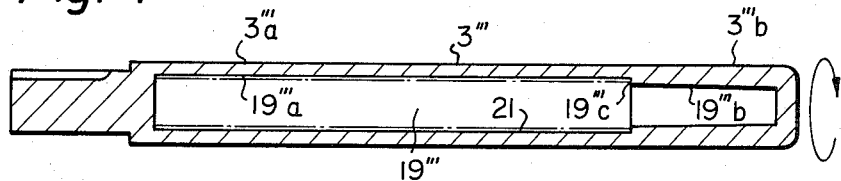
FIG. 4 is a cross sectional elevational view of a heat pipe of another embodiment according to the present invention.

Another embodiment will now be explained with reference to FIG. 4. Since all the parts except a rotary shaft of this embodiment are substantially the same as those of the embodiment described with reference to FIG. 1, only the rotary shaft will not be explained and the other parts are omitted from the description herein and FIG. 4. The rotary shaft 3''' has a heating zone 3'''a and a cooling zone 3'''b, and has a hole 19''' formed therein. The hole 19''' comprises an inner wall 19'''a of cylindrical shape having a constant diameter formed within the heating zone, a concavo-conical shaped inner wall 19'''b spreading out toward the inner wall 19'''a and having a diameter smaller than that of the inner wall 19'''a and formed within the cooling zone, and a step 19'''c connecting the inner wall 19'''a to the inner wall 19'''b.

Due to the existence of the step portion 19'''c, the working fluid charged in the hole 19''' in liquid state does not wet the inner wall 19'''b of the cooling-zone while the heat pipe is rotating, and the heat resistance is not increased because only a very thin fluid layer is formed on the inner wall 19'''b of the cooling zone due to the condensation of vapor. As a result, the cooling effect can be increased. In addition, since the inner wall 19'''b of the cooling zone is formed in a concavo-conical shape, the condensed working fluid which has discharged the latent heat flows along the inner wall 19'''b due to the centrifugal force and gravity, and therefore, the heat transfer is facilitated. The heat transfer becomes considerably large when the heat pipe is rotating at a high speed. The inclination of the inner wall 19'''b of the cooling zone may be smaller than the inclination of the inner wall 19"b illustrated in FIG. 3, because only the condensed working fluid flows along the inner wall 19'''b.

According to the present invention, the cooling effect of a rotary electric machine can be considerably increased in comparison with the prior art. For example, a comparison test was conducted between a direct current motor, illustrated in FIG. 1, of the present invention and a direct current motor having a heat pipe mounted therein, illustrated in FIG. 2. The cooling effect of the direct current motor of the present invention is higher than the other direct current motor by 40%.

What we claim is:

1. A rotary electric motor having a heat pipe therein for cooling the motor, said heat pipe having a first portion positioned within a heating zone and a second portion positioned within a cooling zone, said heat pipe comprising a rotary shaft having an axial hole formed therein, said axial hole having a first diameter in said heating zone and a second diameter in said cooling zone, wherein said second diameter is less than said first diameter, at least one step means formed in said axial hole between said first portion and said second portion thereof, said step means preventing a layer of working fluid formed on the wall of the axial hole in said first portion from flowing into said second portion, wherein the height of said step means is at least $\alpha D_1/4$ where $\alpha$ is the ratio of volume of the working fluid to the volume of the axial hole in said first portion and $D_1$ is the diameter of the hole in said first portion.

2. A rotary electric motor as set forth in claim 1 further including a plurality of radiating fins fixed to said shaft in the cooling zone and fan means positioned with respect to said fins for drawing air along said fins thereby removing heat therefrom.

* * * * *